United States Patent Office 3,839,369
Patented Oct. 1, 1974

3,839,369
PROCESS FOR THE PRODUCTION OF $\Delta^{4,9(11),16}$-3,20-DIKETO STEROIDS
Helmut Hofmeister, Henry Laurent, Klaus Prezewowsky, and Rudolf Wiechert, Berlin, Germany, assignors to Schering Aktiengesellschaft, Berlin and Bergkamen, Germany
No Drawing. Filed July 16, 1973, Ser. No. 379,822
Claims priority, application Germany, July 20, 1972, P 22 36 115.5
Int. Cl. C07c 169/34
U.S. Cl. 260—397.45                 9 Claims

ABSTRACT OF THE DISCLOSURE $\Delta^{9(11),16}$-20-diketo steroids are produced by heating at above 80° the nitric acid 11,17-diester of an $11\beta,17\alpha$-dihydroxy-20-keto steroid in the presence of an alkali or alkaline earth salt of a lower carboxylic acid.

BACKGROUND OF THE INVENTION

This invention relates to a process for the production of $\Delta^{9(11),16}$-steroids.

Processes for the preparation of $\Delta^{4,9(11),16}$-3,20-diketo steroids have been known for some time. For example, the triamcinolone synthesis by Bernstein et al., J. Amer. Chem. Soc. 78 (1956), 5693, starts with cortisone to produce 21-acetoxy-4,9(11),16-pregnatriene-3,20-dione, employing the following reactions: masking of the 3- and 20-carbonyl groups in the cortisone by ketalization; reduction of the 11-keto group to the $11\beta$-hydroxy group; acetylation of the 21-hydroxy group; treatment with thionyl chloride in pyridine under cold conditions to introduce the $\Delta^{9(11)}$- and $\Delta^{16}$-double bonds; and finally splitting off the ketal groups to regenerate the 3- and 20-keto groups. This process has the disadvantage of requiring five reactions with poor overall yields.

It is an object of the present invention to provide a commercially feasible process for the production of $\Delta^{4,9(11)},16$-3,20-diketo steroids.

SUMMARY OF THE INVENTION

According to this invention $\Delta^{9(11),16}$-20-keto steroids, e.g., $\Delta^{4,9(11),16}$-3,20-diketo steroids of the general formula

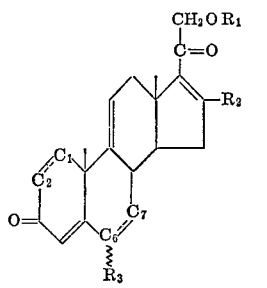

I wherein $C_1$---$C_2$ and $C_6$---$C_7$ are single or double bonded carbon atoms; $R_1$ is hydrogen or lower acyl of 1–6 carbon atoms; $R_2$ is hydrogen or lower alkyl of 1–3 carbon atoms; $R_3$ is hydrogen, lower alkyl of 1–3 carbon atoms, fluorine or when $C_6$---$C_7$ is $$-\underset{|}{C}=CH-,$$

chlorine or bromine, are produced by heating a nitrate diester of an $11\beta,17\alpha$-dihydroxy-20-keto steroid, e.g., a compound of the general formula

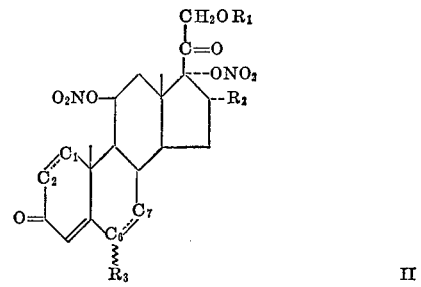

II wherein $R_1$, $R_2$ and $R_3$, $C_1$---$C_2$ and $C_6$---$C_7$ have the values given above, at a temperature above 80° C., in the presence of an alkali or alkaline earth salt of a lower carboxylic acid.

DETAILED DISCUSSION

Preferred starting compounds are those of Formula II wherein:
 (a) $R_2$ is hydrogen or methyl;
 (b) $R_3$ is hydrogen, methyl or fluoro, especially those of (a);
 (c) $C_6$---$C_7$ is $$-\underset{|}{C}HCH_2-,$$

especially those of (a) and (b), wherein $R_3$ is $\alpha$-methyl and $\alpha$-fluoro;
 (d) $R_1$ is hydrogen or acetyl, especially those of (a) (b) and (c).

The starting nitrate diester, to be convertible to a $\Delta^{9(11),16}$-steroid, must have a hydrogen atom at the 9- and 16-positions and a keto group at the 20-position. The structure of the starting steroid is otherwise not critical for operability. Preferred starting steroids also have a keto group at the 3-position and preferably also a double bond at the 4-position. Those of Formula II, i.e., having angular methyl groups at the 13 and preferably also the 10 position, are particularly preferred.

When $R_1$ is acyl, it is preferably lower-alkanoyl. However, it will be apparent to those skilled in the art that other acyl groups are equivalent in the starting compounds of the process of this invention. Examples of such other acyl groups are those wherein the acyl group is that of a saturated or unsaturated aliphatic, cyclo-aliphatic or aromatic, substituted or unsubstituted carboxylic acid containing a total of 1–6 carbon atoms, inclusive. Preferred carboxylic acid acyl groups are those of alkanoic acids, e.g., formic acid, acetic acid, propionic acid, butyric acid, isobutyric acid, the valeric acids, e.g. n-valeric acid and trimethylacetic acid, and the caproic acids, e.g., n-caproic acid, tert.-butylacetate acid, and diethylacetic acid. Examples of other carboxylic acids are cyclopropyl-, cyclobutyl- and cyclopentyl-carboxylic acid, cyclopropylacetic acid, cyclobutylacetic acid and cyclopentyl acetic and -propionic acd.

Surprisingly, both nitrate ester groups are split off simultaneously during the heat treatment of the $11\beta,17\alpha$-dinitrate esters of $\Delta^4$-3,20-diketo steroids in the presence of an alkali or alkaline earth salt of a lower carboxylic acid, thus obtaining the corresponding $\Delta^{9(11),16}$-unsaturated steroids. This course of reaction could not be expected since, in accordance with the progression of the reaction of the "acetate method" described in German Unexamined Published Application DAS 2,023,434, a $17\alpha$-acetoxy group is split off with the formation of a $\Delta^{16}$-double bond but the $11\beta$-acetoxy group remains.

In the process of this invention, a nitrate diester of an $11\beta,17\alpha$-dihydroxy-20-keto steroid is heated with an alkali metal salt or alkaline earth metal salt of a lower carboxylic acid of up to 8 carbon atoms, for example, formic, acetic, propionic, butyric, valeric, and caproic acids, preferably acetic acid. Examples of suitable alkali and/or alkaline earth salts of these acids are sodium formate, potassium acetate, magnesium propionate, lithium caproate, etc. Potassium acetate is preferred.

Because the reactants are solids, the reaction is ordinarily conducted in the presence of a reaction solvent. A preferred class of solvents are the polar water miscible organic liquids, e.g., pyridine and other aromatic heterocyclic tertiary amines, tetrahydrofuran and other water soluble cyclic ethers, dimethylacetamide, etc., preferably dimethylformamide. The amount of solvent employed is not critical. Preferably enough is employed to completely dissolve the starting steroid.

A liquid boiling below 80° C. can be employed as reaction solvent if the reaction is conducted under pressure.

The reaction is preferably conducted under anhydrous conditions.

Since the alkali or alkaline earth salt is converted to a nitrate salt in the reaction and is thus consumed, optimum yields are obtained when at least an equimolar amount thereof, calculated on the starting steroid, is employed. Ordinarily, a molar excess, e.g., 2–10 or more molar equivalents, is employed.

The course of the reaction according to the process of this invention is determined, inter alia, by the temperature. Suitably, the reaction is conducted in a temperature range of between 80° C. and the boiling temperature of the solvent employed, preferably about 100 to 150° C., e.g., about 110–120° C. At temperatures lower than 80° C., the reaction speed is too low for obtaining technically useful yields. Excessively high temperatures, e.g., above 150° C., under pressure lead to undesired secondary reactions and resultant lower yields.

The reaction time required to achieve complete reaction is essentially inversely proportional to the reaction temperature and can vary from a few minutes to a day or longer. Usually less than an hour is required to complete the reaction at temperatures above about 100° C.

The product can be isolated and purified in a conventional manner or used without isolation in the next step of the synthesis.

The starting 11β,17-dinitryloxy-3,20-diketo steroids can be prepared, for example, in accordance with the process of German Published Application DOS 1,643,034, viz., by the nitric acid esterification of the corresponding 11β, 17-dihydroxy steroid with concentrated nitric acid in the presence of acetic anhydride.

The compounds prepared according to the process of this invention are either themselves biologically effective compounds or are intermediates for the production of valuable drugs in a conventional manner.

Thus, the conventional effective triamcinolone acetonide is obtained, for example, from 21-acetoxy-1,4,9(11), 16-pregnatetraene-3,20-dione by partial hydroxylation of the $\Delta^{16}$-double bond with potassium permanganate or osmiumtetroxide dissolved in acetone and formic acid to give the 16,17-diole; treating the 16,17-diole with acetone in the presence of a catalytical amount of perchloric acid; reacting the thus obtained 16,17-acetonide with N-bromosucinimide in an aqueous solution of dioxane to the halohydrin; heating of the 9,11-bromohydrin dissolved in ethanol in the presence of potassium acetate to give the 9β,11β-epoxide; cleavage of the epoxy ring with hydrofluoric acid in dimethyl formamide at −10° C.; thus triamcinolone acetonide is obtained by hydrolysis of the 21-acetoxy grouping with potassium hydroxide in methanol.

In a respective manner, without the introduction of the acetonide grouping, the free triamcinolone can be obtained.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

At −10° C., 21 ml. of acetic anhydride is combined with 13.5 ml. of concentrated nitric acid (sp. gr. 1.50). Under agitation, 3 g. of 11β,17-dihydroxy-21-acetoxy-1,4-pregnadiene-3,20-dione is added to this mixture. The latter is allowed to stand for 20 hours at 0° C. and then stirred into ice water. The precipitate is vacuum-filtered, washed with water, taken up in methylene chloride, and dried over sodium sulfate. After recrystallization from acetone/hexane, 3.1 g. of 11β,17-dinitryloxy-21-acetoxy-1,4-pregnadiene-3,20-dione is obtained, m.p. 154.5–159° C. (decomposition).

UV: $\epsilon_{238}=16,700$ (methanol).

10 g. of 11β,17-dinitryloxy-21-acetoxy-1,4-pregnadiene-3,20-dione is agitated under a nitrogen atmosphere with 5 g. of potassium acetate in 100 ml. of dimethylformamide at 120° C. for 45 minutes. The reaction product is introduced into ice water and worked up as described above. After chromatography on silica gel with 17.6–21.8% acetone/hexane, the product is 5.1 g. of 21-acetoxy-1,4,9(11),16 - pregnatetraene - 3,20 - dione, m.p. 161–164.5° C. (acetone/hexane).

UV: $\epsilon_{239}=23,400$ (methanol).

EXAMPLE 2

4.0 g. of 11β,17-dihydroxy-21-acetoxy-6α-methyl-1,4-pregnadiene-3,20-dione is reacted, as described in Example 1, with a mixture of 28 ml. of acetic anhydride and 18 ml. of concentrated nitric acid. After 10 hours, the reaction solution is stirred into ice water. The precipitate is vacuum-filtered, washed with water, taken up in methylene chloride, and dried over sodium sulfate.

3.8 g. of 11β, 17-dinitryloxy-21-acetoxy-6α-methyl-1,4-pregnadiene-3,20-dione is agitated as a crude product with 1.8 g. of anhydrous potassium acetate in 18 ml. of dimethylformamide at 120° C. under a nitrogen atmosphere. The reaction product is stirred into ice water. The precipitate is vacuum-filtered, taken up in methylene chloride, and dried over sodium sulfate. After chromatography on silica gen with 13–16% acetone/hexane, 2.4 g. of 21-acetoxy-6α-methyl - 1,4,9(11),16 - pregnatetraene-3,20-dione is obtained, m.p. 155–171° C. (decomposition) (acetone/hexane).

UV: $\epsilon_{238}=23,200$ (methanol).

EXAMPLE 3

By reacting 1.5 g. of 11β,17-dihydroxy-21-acetoxy-6α-methyl-4-pregnene-3,20-dione with a mixture of 11 ml. of acetic anhydride and 7 ml. of concentrated nitric acid, 1.6 g. of 11β,17-dinitryloxy-21-acetoxy-6α-methyl-4-pregnene-3,20-dione is obtained which is agitated for one hour at 120° C. with 800 mg. of anhydrous potassium acetate in 10 ml. of dimethylformamide under a nitrogen atmosphere. The reaction product is precipitated in ice water and worked up analogously to Example 2. After chromatography on silica gel with 10–13% acetone/hexane, 615 mg. of 21-acetoxy-6α-methyl-4,9(11),16-pregnatriene-3,20-dione is produced, m.p. 147–149° C. (acetone/hexane).

UV: $\epsilon_{299}=20,200$ (methanol).

EXAMPLE 4

2.3 g. of 11β,17-dinitryloxy-21-acetoxy-4-pregnene-3,20-dione is agitated with 1 g. of anhydrous potassaum acetate in 12 ml. of dimethylformamide at 120° C. under a nitrogen atmosphere. After one hour, the reaction mixture is stirred into ice water, the precipitate is worked up analogously to Example 2, and the product after chromatography on silica gel with 10–13.5% acetone/hexane is 1.4 g. of 21-acetoxy-4,9(11),16-pregnatriene-3,20-dione, m.p. 124–127° C. (acetone/hexane), obtained by isolation.

UV: $\epsilon_{239}=23,800$ (methanol).

EXAMPLE 5

Analogously to Example 1, 1.1 g. of 11β,17-dinitryl-oxy-21-acetoxy - 16α - methyl-4-pregnene-3,20-dione is obtained from 1.2 g. of 11β,17-dihydroxy-21-acetoxy-16α-methyl-4-pregnene-3,20-dione with a mixture of 10 ml. of acetic anhydride and 6 ml. of concentrated nitric acid; this crude product is reacted with 800 mg. of anhydrous potassium acetate in 10 ml. of dimethylformamide at 110° C. under a nitrogen atmosphere. After 45 minutes, the reaction mixture is stirred into ice water and the precipitate worked up analogously to Example 2. After chromatography on silica gel with 8.5–13% acetone/hexane, 415 mg. of 21-acetoxy-16-methyl-4,9(11),16-pregatriene-3,20-dione is produced, m.p. 139–141° C. (acetone/hexane).

UV: $\epsilon_{240}$=22,000 (methanol).

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the production of $\Delta^{9(11),16}$-20-keto steroids which comprises heating a nitrate 11,17-diester of an 11β,17α-dihydroxy-20-keto steroid having a hydrogen atom at the 9-position at a temperature of above 80° C., in the presence of an alkali salt or alkaline earth salt of a lower carboxylic acid.

2. A process according to Claim 1 for the production of $\Delta^{4,9(11)16}$-3,20-diketo steroids of the formula

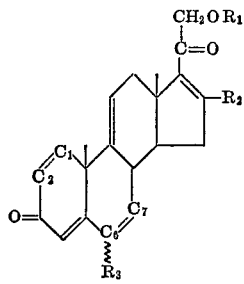

wherein $C_1$___$C_2$ and $C_6$___$C_7$ are single or double bonded carbon atoms, $R_1$ is hydrogen or lower acyl of 1–6 carbon atoms, $R_2$ is hydrogen or lower alkyl of 1–3 carbon atoms, $R_3$ is hydrogen, lower alkyl of 1–3 carbon atoms, fluorine, or when $C_6$___$C_7$ is

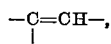

chlorine or bromine, which comprises employing as starting compound a compound of the formula

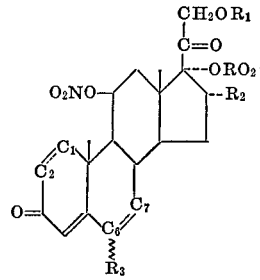

wherein $C_1$___$C_2$, $C_6$___$C_7$ and $R_1$, $R_2$ and $R_3$ have the values given therein.

3. A process according to Claim 1 wherein the heating is conducted at about 100 to 150° C.

4. A process according to Claim 1 wherein the heating is conducted in the presence of potassium acetate.

5. A process according to Claim 2 wherein $R_2$ is hydrogen or methyl; $R_3$ is hydrogen, methyl or fluoro; and $C_6$___$C_7$ is

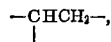

6. A process according to Claim 5 wherein $R_1$ is hydrogen or acetyl.

7. A process according to Claim 5 wherein the reaction solvent is dimethylformamide.

8. A process according to Claim 5 wherein the heating is conducted at about 100 to 120° C. in the presence of potassium acetate.

9. A process according to Claim 8 wherein $R_1$ is hydrogen or acetyl and wherein the reaction solvent is dimethylformamide.

No references cited.

HENRY A. FRENCH, Primary Examiner

U.S. Cl. X.R.
260—239.55 D

UNITED STATES PATENT OFFICE
CERTIFICATE OF CORRECTION

Patent No. 3,839,369　　　　　　　　Dated　October 1, 1974

Inventor(s)　Helmut Hofmeister, et al.

It is certified that error appears in the above-identified patent and that said Letters Patent are hereby corrected as shown below:

IN THE CLAIMS:

CLAIM 2, COLUMN 6, THE FORMULA COMMENCING ON LINE 10:

The portion of the formula reading " ---$ORO_2$" should read -- ---$ONO_2$ --.

Signed and sealed this 3rd day of December 1974.

(SEAL)
Attest:

McCOY M. GIBSON JR.　　　　　　　C. MARSHALL DANN
Attesting Officer　　　　　　　　Commissioner of Patents